(12) United States Patent
Tantawi et al.

(10) Patent No.: US 10,887,246 B2
(45) Date of Patent: Jan. 5, 2021

(54) ADAPTIVE DATA PACKING

(71) Applicant: International Business Machines Corporation, Armonk, NY (US)

(72) Inventors: Asser Nasreldin Tantawi, Somers, NY (US); Malgorzata Steinder, Leonia, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 16/261,683

(22) Filed: Jan. 30, 2019

(65) Prior Publication Data

US 2020/0244589 A1 Jul. 30, 2020

(51) Int. Cl.
*G06F 15/173* (2006.01)
*H04L 12/911* (2013.01)
*H04L 29/08* (2006.01)
*H04L 12/26* (2006.01)
*G06F 15/16* (2006.01)

(52) U.S. Cl.
CPC .............. *H04L 47/70* (2013.01); *H04L 43/08* (2013.01); *H04L 67/10* (2013.01)

(58) Field of Classification Search
CPC .......... H04L 47/70; H04L 43/08; H04L 67/10
USPC ........................................................ 709/224
See application file for complete search history.

(56) References Cited

U.S. PATENT DOCUMENTS

| | | | | |
|---|---|---|---|---|
| 10,037,617 B2* | 7/2018 | Ebtekar | .................... | G06T 11/60 |
| 10,127,146 B2* | 11/2018 | Moretto | ............. | G06F 11/3688 |
| 10,148,771 B2* | 12/2018 | Yazir | ..................... | G06F 16/245 |
| 10,164,898 B2* | 12/2018 | Tao | .......................... | H04L 47/70 |
| 10,216,541 B2* | 2/2019 | Le Bars | ................... | G06F 9/505 |
| 10,225,207 B2* | 3/2019 | Steinder | .................. | H04L 47/72 |
| 10,241,840 B2* | 3/2019 | Tsai | ....................... | G06F 9/5083 |
| 10,284,636 B2* | 5/2019 | Stelmar Netto | .......... | G06F 9/46 |
| 10,305,747 B2* | 5/2019 | Shahab | ................... | H04L 41/12 |
| 10,313,196 B2* | 6/2019 | Vibhor | ................ | H04L 41/0889 |
| 10,382,260 B1* | 8/2019 | Narang | ................... | G06N 20/00 |
| 10,387,415 B2* | 8/2019 | Chainani | ........... | G06F 16/24554 |

(Continued)

FOREIGN PATENT DOCUMENTS

| CN | 106027643 A | 10/2016 |
|---|---|---|
| CN | 107481412 A | 12/2017 |

OTHER PUBLICATIONS

Anonymous, "Adaptive Distributed Cloud Environment Integration," IP.com No. IPCOM000232494D, IP.com Electronic Publication Date: Nov. 12, 2013, 3 pages.

(Continued)

*Primary Examiner* — Melvin H Pollack
(74) *Attorney, Agent, or Firm* — Amin, Turocy & Watson, LLP

(57) ABSTRACT

Techniques and a system for adaptive data packing are provided. In one example, a system includes a container component and a computing node component. The container component monitors one or more resources for container data in a network environment and determines variability data representative of a variability of the one or more resources for the container data during a period of time. The computing node component that selects a computing node in the network environment for particular container data based on the variability data.

20 Claims, 11 Drawing Sheets

(56) References Cited

U.S. PATENT DOCUMENTS

| | | | |
|---|---|---|---|
| 10,389,598 B2 * | 8/2019 | Padala | H04L 41/0803 |
| 10,417,108 B2 * | 9/2019 | Tankersley | G06F 3/04847 |
| 10,452,789 B2 * | 10/2019 | Madmony | G06F 16/5854 |
| 10,484,473 B2 * | 11/2019 | Moorthi | H04L 67/2847 |
| 10,509,434 B1 * | 12/2019 | Kowalski | H03L 7/00 |
| 10,540,063 B2 * | 1/2020 | Firstenberg | H04L 67/26 |
| 10,579,663 B2 * | 3/2020 | Spisic | G06F 16/355 |
| 10,585,773 B2 * | 3/2020 | Tiwari | G06F 11/3442 |
| 10,592,280 B2 * | 3/2020 | Ballantyne | G06F 9/5027 |
| 10,599,979 B2 * | 3/2020 | Keahey | G06T 11/206 |
| 2015/0160864 A1 | 6/2015 | Usgaonkar et al. | |
| 2017/0085419 A1 | 3/2017 | Zhang et al. | |
| 2018/0234492 A1 * | 8/2018 | Moscibroda | G06F 9/5088 |
| 2018/0349183 A1 * | 12/2018 | Popovic | G06F 9/4881 |
| 2018/0365301 A1 * | 12/2018 | Poghosyan | G06F 16/2477 |
| 2019/0068699 A1 * | 2/2019 | Nethercutt | H04L 67/1029 |
| 2019/0173765 A1 * | 6/2019 | Bertran | H04L 41/5009 |
| 2019/0250946 A1 * | 8/2019 | Parameshwaran | G06F 9/4856 |
| 2019/0268283 A1 * | 8/2019 | Mukherjee | H04L 47/76 |
| 2019/0363954 A1 * | 11/2019 | Sharma | G06F 9/5027 |
| 2020/0004449 A1 * | 1/2020 | Rath | G06F 16/278 |
| 2020/0042920 A1 * | 2/2020 | Moorthy | G06F 9/50 |
| 2020/0067773 A1 * | 2/2020 | Abes | H04L 67/10 |
| 2020/0096994 A1 * | 3/2020 | Cella | G06N 7/005 |
| 2020/0097832 A1 * | 3/2020 | Edgar | G06N 10/00 |

OTHER PUBLICATIONS

Anonymous, "Calculate Optimal Placement of Cloud Groups into Expert Integrated Systems," IP.com No. IPCOM000236022D, IP.com Electronic Publication Date: Apr. 2, 2014, 4 pages.

Anonymous, "System and Method for Cloud Auto-Scaling Optimization," IP.com No. IPCOM000253488D, IP.com Electronic Publication Date: Apr. 4, 2018, 5 pages.

Anonymous, "Method and System for Managing Nodes in Container Cluster Environment based on Availability of Instances, Hot Swap, and Prediction," IP.com No. IPCOM000254416D, IP.com Electronic Publication Date: Jun. 26, 2018, 5 pages.

Mao, et al., "Small Boxes Big Data: A Deep Learning Approach to Optimize Variable Sized Bin Packing," arXiv:1702.04415v1 [cs.LG] Feb. 14, 2017, 10 pages.

Gbaguidi, et al., "Adapted Bin Packing Algorithm for Virtuals Machines Placement Into Datacenters," CSIA—2017, pp. 69-80, 2017.

Mel, et al., "The NIST Definition of Cloud Computing," NIST Special Publication 800-145, Sep. 2011, 7 pages.

* cited by examiner

ADAPTIVE DATA PACKING

BACKGROUND

The subject disclosure relates to computing resource allocation for network infrastructure and more specifically, to adaptive data packing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products for facilitating adaptive data packing are described.

According to an embodiment, a system can comprise a container component and a computing node component. The container component can monitor one or more resources for container data in a network environment. The container component can also determine variability data representative of a variability of the one or more resources for the container data during a period of time. The computing node component can select a computing node in the network environment for particular container data based on the variability data.

According to another embodiment, a computer-implemented method is provided. The computer-implemented method can comprise monitoring, by a system operatively coupled to a processor, one or more resources in a computing network during a period of time. The computer-implemented method can also comprise determining, by the system, variability data representative of a variability of the one or more resources during the period of time. Furthermore, the computer-implemented method can comprise selecting, by the system, a computing node in the computing network for container data based on the variability data.

According to yet another embodiment, a computer program product for facilitating adaptive data packing can comprise a computer readable storage medium having program instructions embodied therewith. The program instructions can be executable by a processor and cause the processor to monitor, by the processor, one or more resources in a network environment during a period of time. The program instructions can also cause the processor to determine, by the processor, first variability data representative of a variability of one or more first resources during the period of time. Furthermore, the program instructions can cause the processor to determine, by the processor, second variability data representative of a variability of one or more second resources for a set of computing nodes in the network environment during the period of time. The program instructions can also cause the processor to select, by the processor, a computing node in the network environment for container data based on the first variability data and the second variability data.

DETAILED DESCRIPTION

Figure 1:
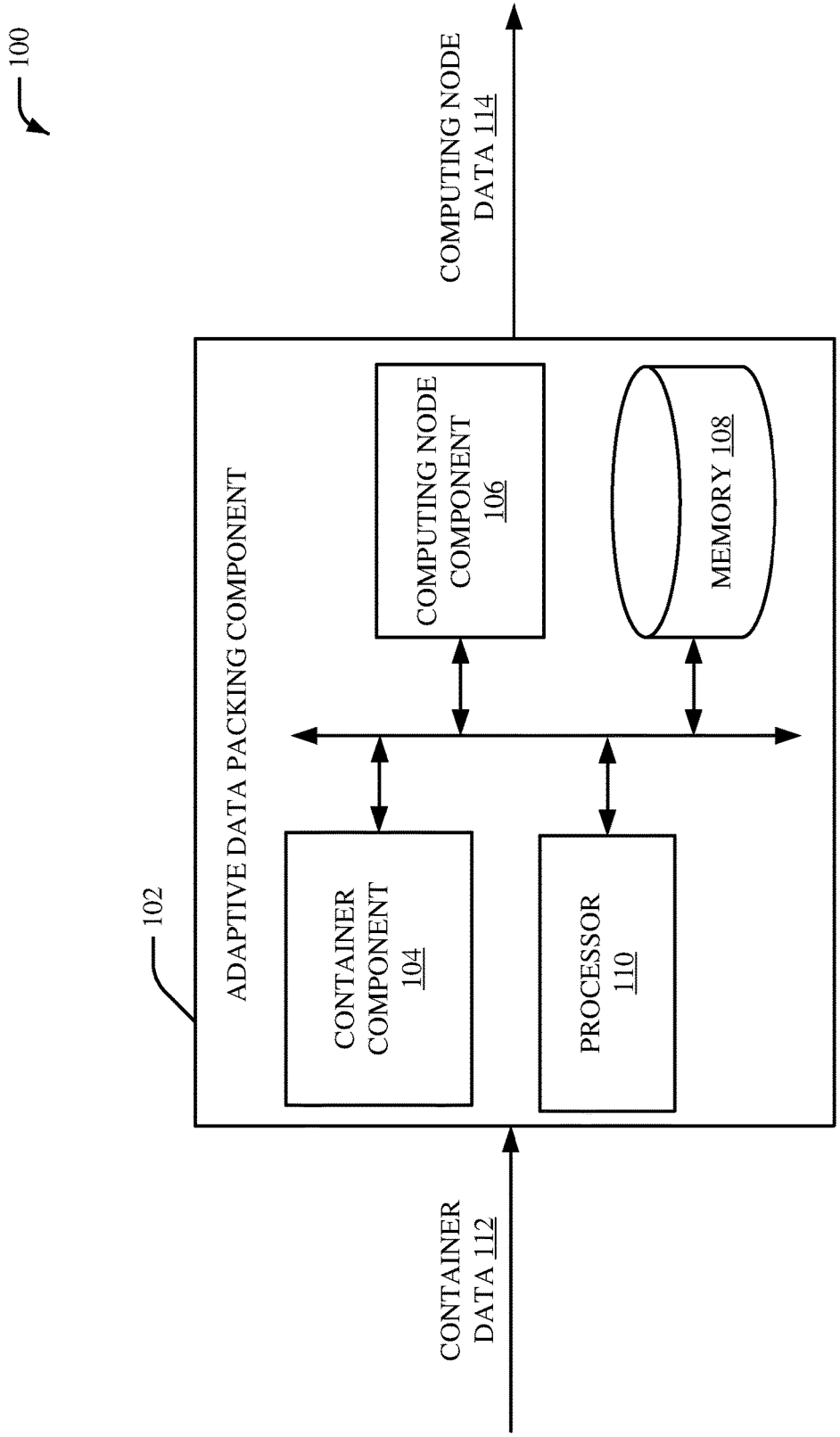
FIG. 1 illustrates a block diagram of an example, non-limiting system that includes an adaptive data packing component in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

When creating a cluster of computing nodes in a network environment, a workload mix of a container is generally not known a priori. For example, a cluster scheduler in a network environment may begin with a spreading policy and transition to a packing policy, or vice versa. Furthermore, a scheduler in a network environment generally does not provide numerous policy choices for a container. Thus, a scheduler in a network environment that dynamically changes objectives is desired. Additionally or alternatively, a system that dynamically adjusts to an observed workload mix is desirable.

To address these or other issues, embodiments described herein include systems, computer-implemented methods, and computer program products for adaptive data packing. As disclosed herein, in certain embodiments, "data packing" can refer to a bin packing process associated with memory allocation. In an aspect, an adaptive data packing scheduling policy for a network environment can be provided. The adaptive data packing can be implemented, for example, within an optimizer algorithm. For example, the adaptive data packing can be implemented within a biased sampling algorithm global optimizer algorithm. Additionally, in certain embodiments, the adaptive data packing can be implemented as a scheduler plug-in for a scheduler in a network environment. In an aspect, the adaptive data packing disclosed herein can provide load balancing across computing nodes as schedule containers of different sizes arrive, while also minimizing rejection probability. In an embodiment associated with a container cloud environment where computing nodes have limited resources and container requests with resource needs are submitted online, containers can be provided to computing nodes so as to optimize resource usage while minimizing rejection of large containers. For example, container resource needs can be observed over time. Furthermore, a measure of container resource needs variability represented by one or more first numbers can be calculated, where the one or more first numbers are associated with a container resource needs. A measure of variability in resource availability among one or more computing nodes represented by one or more second numbers can also be calculated, where the one or more second numbers are associated with a resource in a computing node. Additionally, a particular computing node can be determined to place a container so as the one or more first numbers and the one or more second numbers are closest. In certain embodiments, a measure of variability (e.g., heterogeneity) for the container resource needs or the resource availability among the one or more computing nodes can be a coefficient of variation. In an aspect, a first measure of variability can be a measure of variability in a workload (e.g., container demand) and a second measure of variability can be a measure of variability for variability in system availability over computing nodes in the cluster. In an example where only one resource (e.g. a central processing unit, a memory, etc.) is implemented in a system, the measure of variability can be a single number. In another example, where multiple resources are implemented in a system, the measure of variability can be a vector of numbers. Containers can be placed in such a way that the first measure of variability and the second measure of variability are "close" to each other (e.g., the first measure of variability and the second measure of variability are equalized) after the containers are placed. As disclosed herein, "close" can refer to a value of a difference between the first measure of variability and the second measure of variability in an example associated with a single resource. Additionally or alternatively, "close" can refer to a distance measure (e.g., a Euclidean distance) between two vectors associated with the first measure of variability and the second measure of variability in an example associated with multiple resources. As such, performance of a network environment can be improved. Additionally or alternatively, performance of one or more computing nodes can be improved. Furthermore, resource usage in a network environment can be optimized.

FIG. 1 illustrates a block diagram of an example, non-limiting system 100 for adaptive data packing in accordance with one or more embodiments described herein. In various embodiments, the system 100 can be a system associated with technologies such as, but not limited to, network technologies, computing node technologies, memory technologies, storage technologies, cloud computing technologies, network platform technologies, network infrastructure technologies, artificial intelligence technologies, machine learning technologies, or other technologies. The system 100 can employ hardware or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized computer with an adaptive data packing component, etc.) for carrying out defined tasks related to adaptive data packing. The system 100 or components of the system 100 can be employed to solve new problems that arise through advancements in technologies mentioned above, computer architecture, network architecture, or the like. One or more embodiments of the system 100 can provide technical improvements to network systems, computing node systems, memory systems, storage systems, cloud computing systems, network platform systems, network infrastructure systems, artificial intelligence systems, machine learning systems, or other systems. One or more embodiments of the system 100 can also provide technical improvements to a computing node (e.g., a processor) by improving processing performance of the computing node, improving processing efficiency of the computing node, improving processing characteristics of the computing node, improving timing characteristics of the computing node or improving power efficiency of the computing node.

In the embodiment shown in FIG. 1, the system 100 can include an adaptive data packing component 102. As shown in FIG. 1, the adaptive data packing component 102 can include a container component 104 and a computing node component 106. Aspects of the adaptive data packing component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the adaptive data packing component 102 can also include memory 108 that stores computer executable components and instructions. Furthermore, the adaptive data packing component 102 can include a processor 110 to facilitate execution of the instructions (e.g., computer executable components and corresponding instructions) by the adaptive data packing component 102. As shown, the container component 104, the computing node component 106, the memory 108 or the processor 110 can be electrically or communicatively coupled to one another in one or more embodiments.

The adaptive data packing component 102 (e.g., the container component 104 of the adaptive data packing component 102) can receive container data 112. The container data 112 can be a data structure that includes a set of data associated with a logical packaging mechanism. For example, the container data 112 can include data packaged with a set of libraries, a set of data groupings or other data. In certain embodiments, the container data 112 can be cloud container data. For instance, the container data 112 can be container data transmitted via a network. Additionally or alternatively, the container data can be container data received via a network environment. In certain embodiments, the container data 112 can be software that consumes one or more resources or is executed on a computing node. In an embodiment, the container component 104 can monitor one or more resources for the container data 112. For example, the container component 104 can determine one or more needs for the one or more resources for the container data 112. In an aspect, the container component 104 can monitor one or more data logs for the container data 112. The one or more data logs can include log data for one or more events associated with the container data 112, timestamp data for one or more events associated with the container data 112, metadata for one or more events associated with the container data 112, or other data associated with the container data 112. Additionally or alternatively, the container component 104 can monitor one or more container metrics for the container data 112. The one or more container metrics can include, for example, processor usage associated with the container data 112, memory usage associated with the container data 112, used memory associated with the container data 112, available memory associated with the container data 112, or one or more other metrics associated with the container data 112. In an aspect, the container data 112 can be associated with one or more resources in a network environment. For instance, the container data 112 can be associated with one or more processors in the network environment, one or more central processing units in the network environment, one or more memories in the network environment, one or more network devices in the network environment, or one or more other devices in the network environment.

In another embodiment, the container component 104 can determine first variability data representative of a variability of the one or more first resources for the container data 112 during a period of time. For example, the first variability data can be a coefficient of variation associated with the one or more first resources for the container data 112 during the period of time. The one or more first resources can be, for example, one or more resources in the network environment. For instance, the one or more first resources for the container data 112 can be one or more resources associated with one or more processors in the network environment, one or more central processing units in the network environment, one or more memories in the network environment, one or more network devices in the network environment, or one or more other devices in the network environment. In an aspect, the first variability data can be a measure of variability for one or more needs for the one or more first resources associated with the container data 112. For example, the first variability data can be a measure of heterogeneity for one or more needs for the one or more first resources associated with the container data 112. In another aspect, the container component 104 can calculate one or more first numbers associated with the first variability data. For instance, the container component 104 can calculate one or more first numbers that represent a measure of variability for container resource needs associated with the container data 112. In an example, the container component 104 can calculate a first measure of variability (e.g., a first number) associated with first container resource needs for a first container associated with the container data 112, a second measure of variability (e.g., a second number) associated with second container resource needs for a second container associated with the container data 112, a third measure of variability (e.g., a third number) associated with third container resource needs for a third container associated with the container data 112, etc. In yet another aspect, the first variability data can be a measure of variability in a workload associated with the container data 112. The workload can be, for example, a container demand associated with the container data 112. In an example where a single resource (e.g. a central processing unit, a memory, etc.) is associated with the container data 112, then the first variability data can be a single number. In another example where the container data 112 is associated with multiple resources, then the first variability data can be a vector of numbers.

Additionally or alternatively, in yet another embodiment, the container component 104 can determine second variability data representative of a variability of one or more second resources for a set of computing nodes in the network environment during the period of time. For instance, the second variability data can be representative of a variability of one or more second resources for a set of computing nodes in the network environment associated with the container data 112. The set of computing nodes can be, for example, one or more computing nodes associated with one or more processors, one or more processing units, one or more central processing unit cores, one or more graphic processing units, one or more storage devices, one or more memories or one or more other computing components. For instance, the set of computing nodes can be a computing cluster with one or more computing nodes associated with one or more processors, one or more processing units, one or more memories or one or more other computing components. In an aspect, one or more computing nodes from the set of computing nodes can be interconnected. Additionally or alternatively, one or more computing nodes from the set of computing nodes can be communicatively coupled. In certain embodiments, the set of computing nodes can be arranged in a tree structure configuration. In an aspect, a computing node from the set of computing nodes can be a computing entity that comprises one or more consumable resources. Furthermore, a computing node from the set of computing nodes can provide an environment for container to be executed. In an embodiment, a computing node from the set of computing nodes can be a physical computing node. In another embodiment, a computing node from the set of computing nodes can be a virtual computing node. In an example, the second variability data can be a coefficient of variation associated with the one or more second resources for the set of computing nodes in the network environment during the period of time. In an aspect, the second variability data can be a measure of variability in resource availability for the one or more second resources for the set of computing nodes in the network environment. For example, the second variability data can be a measure of heterogeneity for an availability of the one or more second resources for the set of computing nodes in the network environment. In another aspect, the container component 104 can calculate one or more second numbers associated with the second variability data. For instance, the container component 104 can calculate one or more second numbers that represent a measure of variability associated with the one or more second resources for the set of computing nodes in the network environment during the period of time. In an example, the container component 104 can calculate a first measure of variability (e.g., a first number) associated with resource availability for a first computing node in the network environment, a second measure of variability (e.g., a second number) associated with resource availability for a second computing node in the network environment, a third measure of variability (e.g., a third number) associated with resource availability for a third computing node in the network environment, etc. In an example where a single resource (e.g. a central processing unit, a memory, etc.) is associated with the container data 112, then the second variability data can be a single number. In another example where the container data 112 is associated with multiple resources, then the second variability data can be a vector of numbers.

The computing node component 106 can select a computing node in the network environment for particular container data based on the first variability data. Additionally or alternatively, the computing node component 106 can select a computing node in the network environment for particular container data based on the second variability data. For example, the computing node component 106 can provide particular container data from the container data 112 to a particular computing node from the set of computing nodes in the network environment based on the first variability data. Additionally or alternatively, the computing node component 106 can provide particular container data from the container data 112 to a particular computing node from the set of computing nodes in the network environment based on the second variability data. In an embodiment, the computing node component 106 can select a computing node in the network environment for particular container data based on an equalization measure of the first variability data and the second variability data. For instance, the computing node component 106 can select a computing node in the network environment for particular container data such that the first variability data and the second variability data are equalized according to an equalization measure. In one example, the computing node component 106 can select a computing node in the network environment for particular container data such that a value of a difference between the first variability data and the second variability data satisfy a defined criterion associated with closeness. In another embodiment, the computing node component 106 can select a computing node in the network environment for particular container data based on a Euclidean distance between the first variability data and the second variability data. For instance, the computing node component 106 can select a computing node in the network environment for particular container data such that a value of a Euclidean distance between the first variability data and the second variability data satisfy a defined criterion associated with closeness. As disclosed herein, a "Euclidean distance" can refer to a measure of similarity associated with an arithmetic difference between data. In certain embodiments, the computing node component 106 can select a computing node in the network environment for particular container data based on a calculated distance between a first single number represented by the first variability data and a second single number represented by the second variability data. In certain embodiments, the computing node component 106 can select a computing node in the network environment for particular container data based on a calculated distance between a first vector of numbers represented by the first variability data and a second vector of numbers represented by the second variability data. In another aspect, the computing node component 106 can generate computing node data 114. The computing node data 114 can include, for example, information associated with the computing node selected by the computing node component 106. For example, the computing node data 114 can include information associated with the computing node selected from the set of computing nodes in the network environment. In certain embodiments, the computing node data 114 can include an identifier for the computing node selected by the computing node component 106, a network address for the computing node selected by the computing node component 106, resource information for the computing node selected by the computing node component 106, memory information for the computing node selected by the computing node component 106, virtual machine information for the computing node selected by the computing node component 106, bin information for the computing node selected by the computing node component 106, or other information associated with the computing node selected by the computing node component 106. In certain embodiments, the computing node component 106 can select the computing node to optimize resource usage in the network environment.

In certain embodiments, the computing node component 106 can additionally or alternatively select a computing node in the network environment for particular container data based on classifications, correlations, inferences or expressions associated with principles of artificial intelligence. For instance, the computing node component 106 can employ an automatic classification system or an automatic classification process to select a computing node in the network environment for particular container. In one example, the computing node component 106 can employ a probabilistic or statistical-based analysis (e.g., factoring into the analysis utilities and costs) to learn or generate inferences with respect to the first variability data or the second variability data. In an aspect, the computing node component 106 can include an inference component (not shown) that can further enhance aspects of the computing node component 106 utilizing in part inference-based schemes to facilitate learning or generating inferences associated with the first variability data or the second variability data. The computing node component 106 can employ any suitable machine-learning based techniques, statistical-based techniques or probabilistic-based techniques. For example, the computing node component 106 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the computing node component 106 can perform a set of machine learning computations associated with analysis of the first variability data or the second variability data. For example, the computing node component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with the first variability data or the second variability data.

It is to be appreciated that the adaptive data packing component 102 (e.g., the container component 104 or the computing node component 106) performs an adaptive data packing process that cannot be performed by a human (e.g., is greater than the capability of a single human mind). For example, an amount of data processed, a speed of data processed or data types of data processed by the adaptive data packing component 102 (e.g., the container component 104 or the computing node component 106) over a certain period of time can be greater, faster and different than an amount, speed and data type that can be processed by a single human mind over the same period of time. The adaptive data packing component 102 (e.g., the container component 104 or the computing node component 106) can also be fully operational towards performing one or more other functions (e.g., fully powered on, fully executed, etc.) while also performing the above-referenced adaptive data packing process. Moreover, the computing node data 114 generated by the adaptive data packing component 102 (e.g., the container component 104 or the computing node component 106) can include information that is impossible to obtain manually by a user. For example, a type of information included in the computing node data 114, or a variety of information included in the computing node data 114 can be more complex than information obtained manually by a user. Additionally, it is to be appreciated that the system 100 can provide various advantages as compared to other techniques. The system 100 can also provide various solutions to problems associated with other techniques. For instance, performance of a network environment or one or more computing nodes can be improved by employing the system 100 (e.g., by employing the adaptive data packing component 102). Furthermore, resource usage in a network environment can be optimized by employing the system 100 (e.g., by employing the adaptive data packing component 102).

Figure 2:
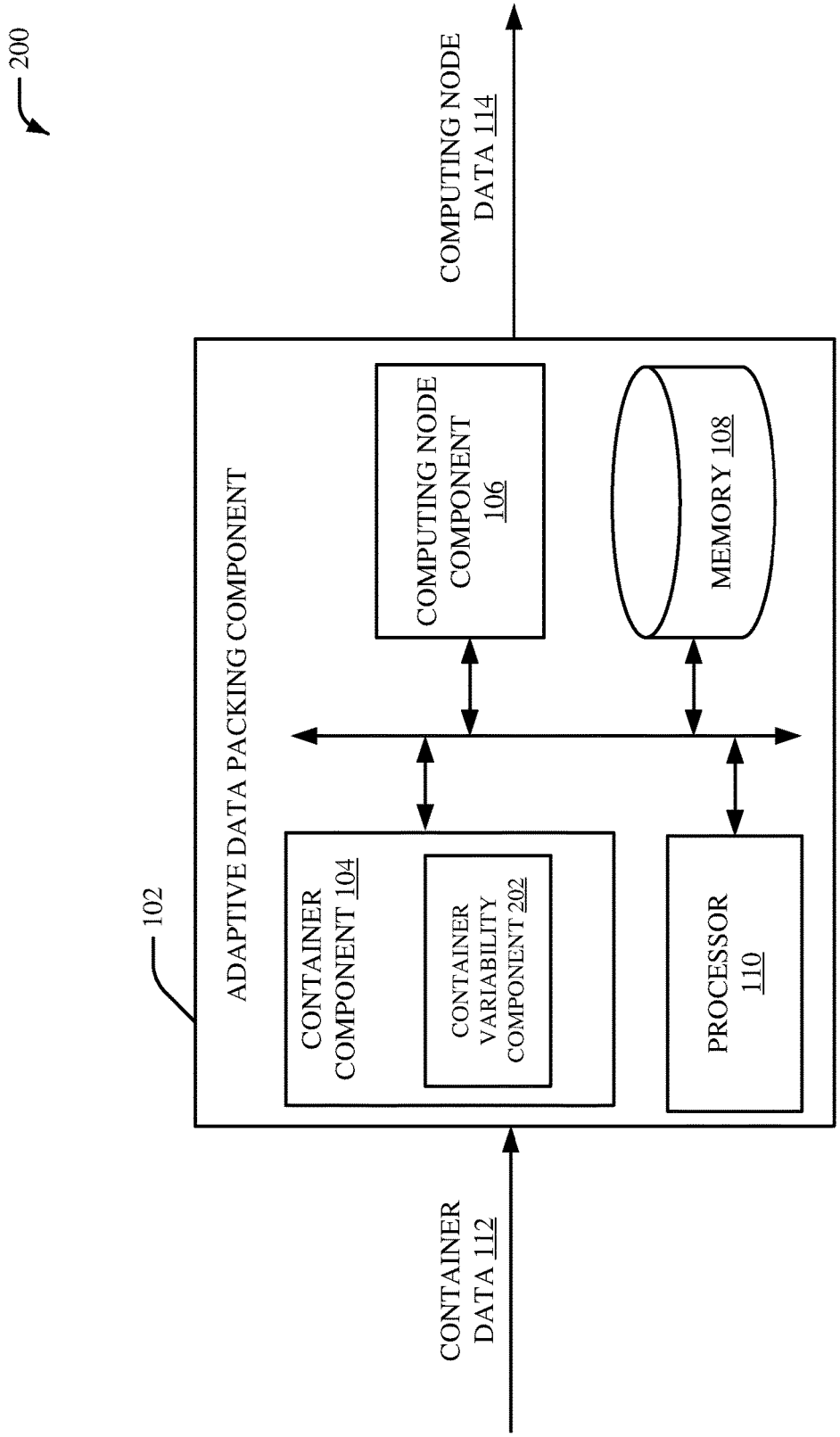
FIG. 2 illustrates a block diagram of another example, non-limiting system that includes an adaptive data packing component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the adaptive data packing component 102. The adaptive data packing component 102 can include the container component 104, the computing node component 106, the memory 108, or the processor 110. In the embodiment shown in FIG. 2, the container component 104 can include a container variability component 202. The container variability component 202 can determine variability data representative of a variability of the one or more resources for the container data 112 during a period of time. For example, the variability data determined by the container variability component 202 can be a coefficient of variation associated with the one or more resources for the container data 112 during the period of time. The one or more resources can be, for example, one or more resources in the network environment. For instance, the one or more resources for the container data 112 can be one or more resources associated with one or more processors in the network environment, one or more central processing units in the network environment, one or more memories in the network environment, one or more network devices in the network environment, or one or more other devices in the network environment. In an aspect, the variability data determined by the container variability component 202 can be a measure of variability for one or more needs for the one or more resources associated with the container data 112. For example, the variability data determined by the container variability component 202 can be a measure of heterogeneity for one or more needs for the one or more resources associated with the container data 112. In another aspect, the container variability component 202 can calculate one or more numbers associated with the variability data determined by the container variability component 202. For instance, the container variability component 202 can calculate one or more numbers that represent a measure of variability for container resource needs associated with the container data 112. In an example, the container variability component 202 can calculate a first measure of variability (e.g., a first number) associated with first container resource needs for a first container associated with the container data 112, a second measure of variability (e.g., a second number) associated with second container resource needs for a second container associated with the container data 112, a third measure of variability (e.g., a third number) associated with third container resource needs for a third container associated with the container data 112, etc. In yet another aspect, the variability data determined by the container variability component 202 can be a measure of variability in a workload associated with the container data 112. The workload can be, for example, a container demand associated with the container data 112. In an example where a single resource (e.g. a central processing unit, a memory, etc.) is associated with the container data 112, then the variability data determined by the container variability component 202 can be a single number. In another example where the container data 112 is associated with multiple resources, then the variability data determined by the container variability component 202 can be a vector of numbers.

In certain embodiments, the container variability component 202 can determine the variability data representative of the variability of the one or more resources for the container data 112 based on classifications, correlations, inferences or expressions associated with principles of artificial intelligence. For instance, the container variability component 202 can employ an automatic classification system or an automatic classification process to determine the variability data representative of the variability of the one or more resources for the container data 112. In one example, the container variability component 202 can employ a probabilistic or statistical-based analysis (e.g., factoring into the analysis utilities and costs) to determine the variability data representative of the variability of the one or more resources for the container data 112. In an aspect, the container variability component 202 can include an inference component (not shown) that can further enhance aspects of the container variability component 202 utilizing in part inference-based schemes to facilitate determining the variability data representative of the variability of the one or more resources for the container data 112. The container variability component 202 can employ any suitable machine-learning based techniques, statistical-based techniques or probabilistic-based techniques. For example, the container variability component 202 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the container variability component 202 can perform a set of machine learning computations associated with determining the variability data representative of the variability of the one or more resources for the container data 112. For example, the container variability component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with determining the variability data representative of the variability of the one or more resources for the container data 112.

Figure 3:
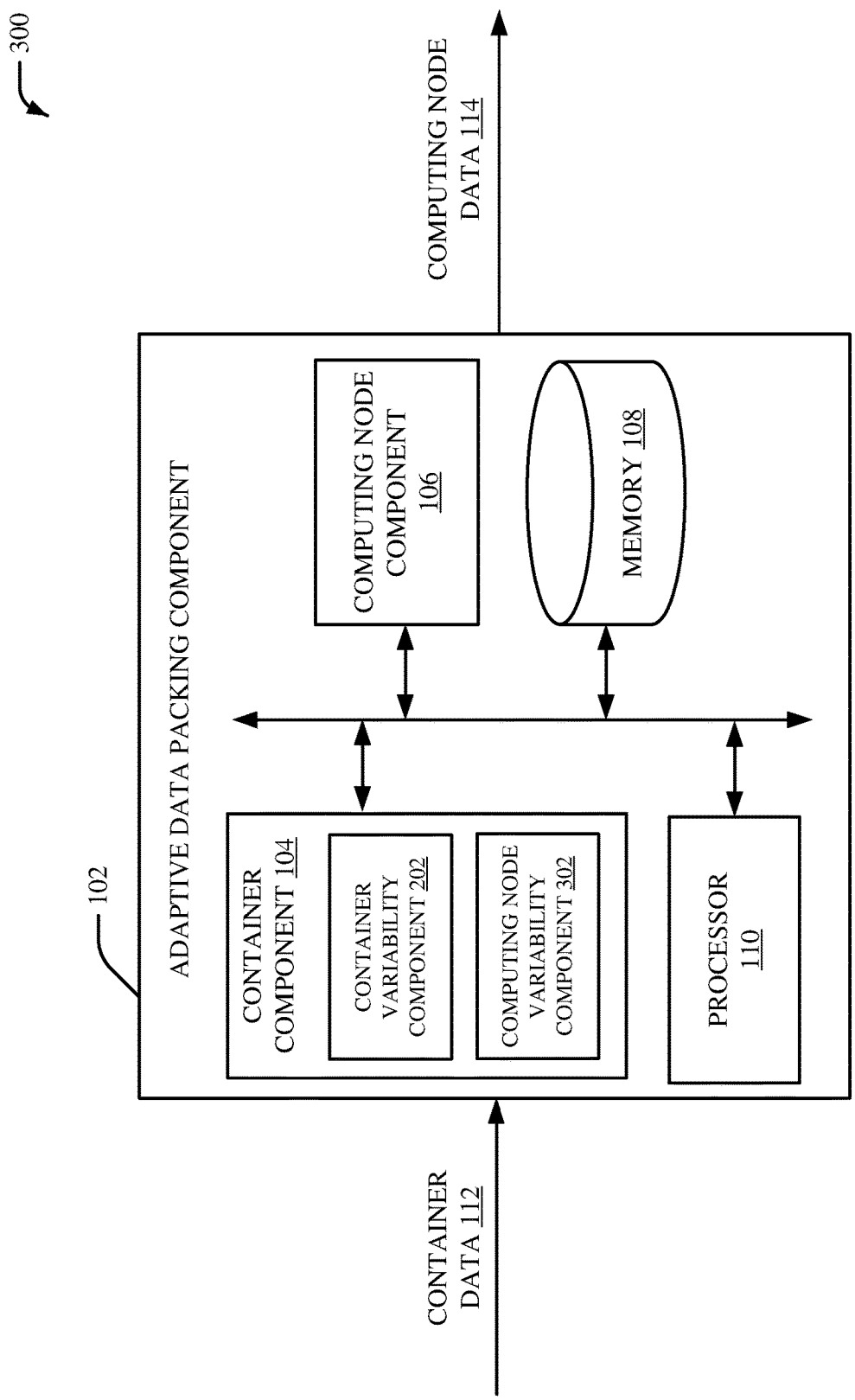
FIG. 3 illustrates a block diagram of yet another example, non-limiting system that includes an adaptive data packing component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the adaptive data packing component 102. The adaptive data packing component 102 can include the container component 104, the computing node component 106, the memory 108, or the processor 110. In the embodiment shown in FIG. 3, the container component 104 can include the container variability component 202 or a computing node variability component 302. The computing node variability component 302 can determine variability data representative of a variability of one or more resources for a set of computing nodes in the network environment during the period of time. For instance, the variability data determined by the computing node variability component 302 can be representative of a variability of one or more resources for a set of computing nodes in the network environment associated with the container data 112. The set of computing nodes can be, for example, one or more computing nodes associated with one or more processors, one or more processing units, one or more memories or one or more other computing components. For instance, the set of computing nodes can be a computing cluster with one or more computing nodes associated with one or more processors, one or more processing units, one or more memories or one or more other computing components. In an aspect, one or more computing nodes from the set of computing nodes can be interconnected or communicatively coupled. In certain embodiments, the set of computing nodes can be arranged in a tree structure configuration. In an example, the variability data determined by the computing node variability component 302 can be a coefficient of variation associated with the one or more resources for the set of computing nodes in the network environment during the period of time. In an aspect, the variability data determined by the computing node variability component 302 can be a measure of variability in resource availability for the one or more resources for the set of computing nodes in the network environment. For example, the variability data determined by the computing node variability component 302 can be a measure of heterogeneity for an availability of the one or more resources for the set of computing nodes in the network environment. In another aspect, the computing node variability component 302 can calculate one or more numbers associated with the variability data determined by the computing node variability component 302. For instance, the computing node variability component 302 can calculate one or more numbers that represent a measure of variability associated with the one or more resources for the set of computing nodes in the network environment during the period of time. In an example, the computing node variability component 302 can calculate a first measure of variability (e.g., a first number) associated with resource availability for a first computing node in the network environment, a second measure of variability (e.g., a second number) associated with resource availability for a second computing node in the network environment, a third measure of variability (e.g., a third number) associated with resource availability for a third computing node in the network environment, etc. In an example where a single resource (e.g. a central processing unit, a memory, etc.) is associated with the container data 112, then the variability data determined by the computing node variability component 302 can be a single number. In another example where the container data 112 is associated with multiple resources, then the variability data determined by the computing node variability component 302 can be a vector of numbers.

In certain embodiments, the computing node variability component 302 can determine the variability data representative of the variability of one or more resources for a set of computing nodes in the network environment based on classifications, correlations, inferences or expressions associated with principles of artificial intelligence. For instance, the computing node variability component 302 can employ an automatic classification system or an automatic classification process to determine the variability data representative of the variability of one or more resources for a set of computing nodes in the network environment. In one example, the computing node variability component 302 can employ a probabilistic or statistical-based analysis (e.g., factoring into the analysis utilities and costs) to determine the variability data representative of the variability data representative of the variability of one or more resources for a set of computing nodes in the network environment. In an aspect, the computing node variability component 302 can include an inference component (not shown) that can further enhance aspects of the computing node variability component 302 utilizing in part inference-based schemes to facilitate determining the variability data representative of the variability of one or more resources for a set of computing nodes in the network environment. The computing node variability component 302 can employ any suitable machine-learning based techniques, statistical-based techniques or probabilistic-based techniques. For example, the computing node variability component 302 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the computing node variability component 302 can perform a set of machine learning computations associated with determining the variability data representative of the variability of one or more resources for a set of computing nodes in the network environment. For example, the computing node variability component 302 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, or a set of different machine learning computations associated with determining the variability data representative of the variability of one or more resources for a set of computing nodes in the network environment.

Figure 4:
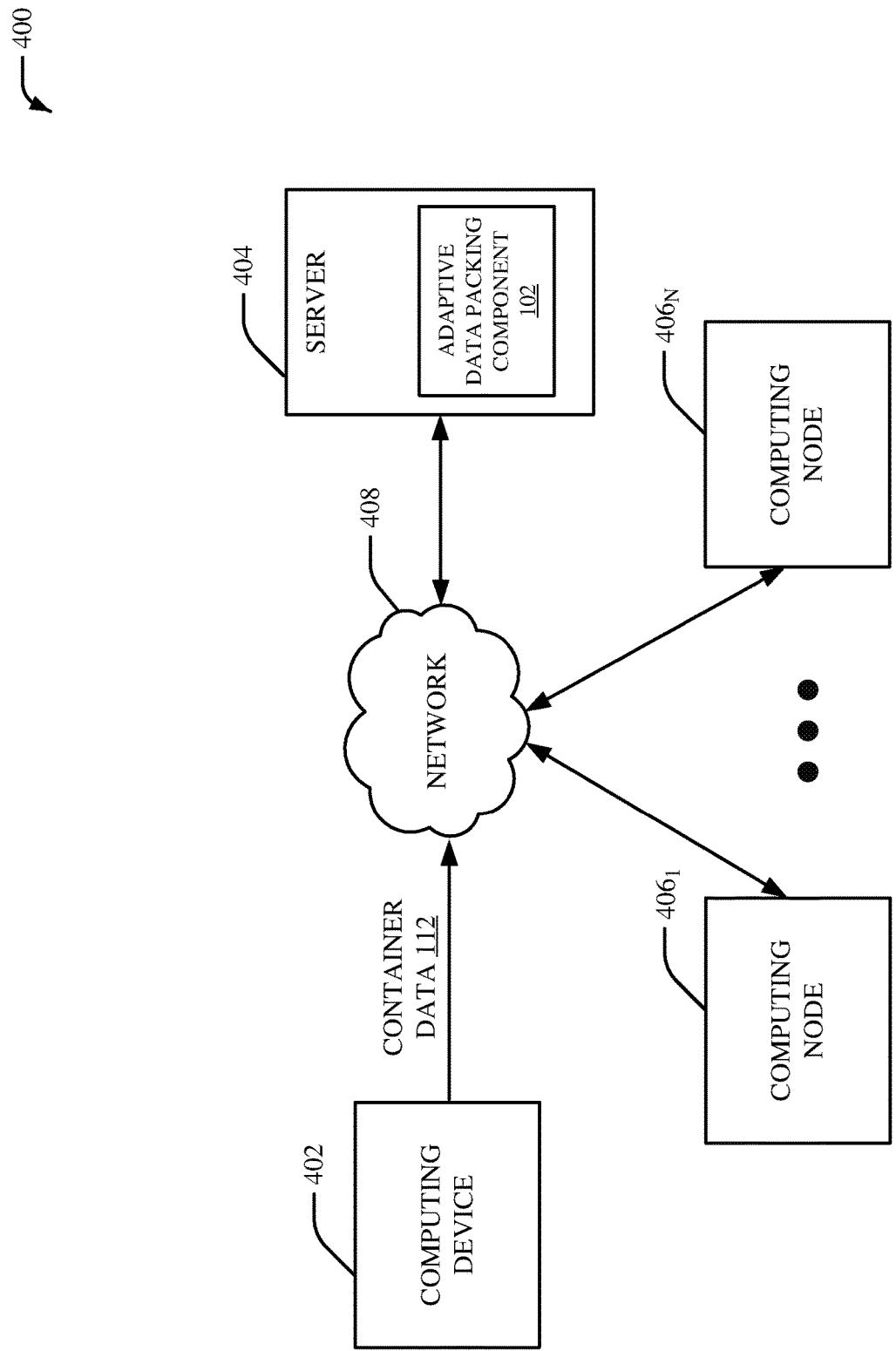
FIG. 4 illustrates an example, non-limiting system associated with a network environment in accordance with one or more embodiments described herein.

FIG. 4 illustrates an example, non-limiting system 400 in accordance with one or more embodiments described herein. Repetitive description of like elements employed in other embodiments described herein is omitted for sake of brevity.

The system 400 includes a computing device 402, a server 404 or a set of computing nodes $406_{1-N}$, where N is an integer. In an embodiment, the system 400 can be a network environment (e.g., a computing network). For instance, the system 400 can be a cloud computing environment. The computing device 402 can be, for example, an electronic device such as, for example, a computer, a desktop computer, a laptop computer, a monitor device, a smart device, a smart phone, a mobile device, a handheld device, a tablet, a portable computing device, a server device, a network device or another type of computing device. In certain embodiments, the computing device 402 can include one or more computing devices. The server 404 can include the adaptive data packing component 102. The adaptive data packing component 102 can include the container component 104, the computing node component 106, the memory 108, the processor 110, the container variability component 202 or the computing node variability component 302. The set of computing nodes $406_{1-N}$ can be one or more computing nodes. Furthermore, the set of computing nodes $406_{1-N}$ can include for example, one or more processors, one or more processing units, one or more memories, one or more network devices, or one or more other computing components. In an aspect, the set of computing nodes $406_{1-N}$ can be a computing cluster with one or more processors, one or more processing units, one or more central processing unit cores, one or more graphic processing units, one or more storage devices, one or more memories, one or more network devices, or one or more other computing components. In an aspect, one or more computing nodes from the set of computing nodes $406_{1-N}$ can be interconnected or communicatively coupled. In certain embodiments, the set of computing nodes $406_{1-N}$ can be arranged in a tree structure configuration. In an embodiment, the adaptive data packing component 102 of the server 404 can be communicatively coupled to the computing device 402 or the set of computing nodes 406$_{1-N}$ via a network 408. The network 408 can be a communication network, a wireless network, a wired network, an internet protocol (IP) network, a voice over IP network, an internet telephony network, a mobile telecommunications network or another type of network. In certain embodiments, the computing device 402 can provide the container data 112 to the adaptive data packing component 102 of the server 404 via the network 408. In an embodiment, the adaptive data packing component 102 of the server 404 can determine variability data representative of a variability of one or more resources for the container data 112 during a period of time. Additionally or alternatively, the adaptive data packing component 102 of the server 404 can determine variability data representative of a variability of one or more resources for the set of computing nodes 406$_{1-N}$ during the period of time. Furthermore, the adaptive data packing component 102 of the server 404 can select a computing node from the set of computing nodes 406$_{1-N}$ for particular container data based on the variability data representative of the variability of the one or more resources for the container data 112. Additionally or alternatively, the adaptive data packing component 102 of the server 404 can select a computing node from the set of computing nodes 406$_{1-N}$ for particular container data based on the variability data representative of the variability of the one or more resources for the set of computing nodes 406$_{1-N}$. In certain embodiments, the adaptive data packing component 102 of the server 404 can select a computing node from the set of computing nodes 406$_{1-N}$ to optimize resource usage in the system 400 (e.g., to optimize resource usage in the network environment).

Figure 5:
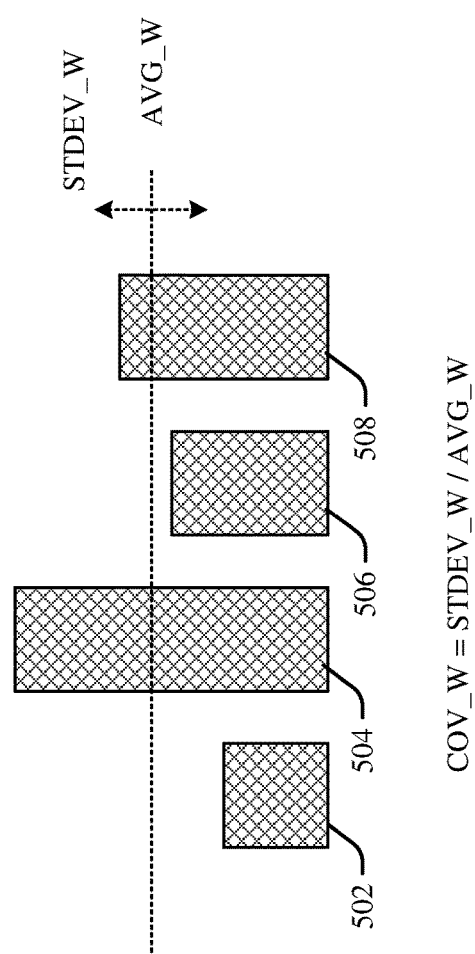
FIG. 5 illustrates an example, non-limiting graphical representation associated with adaptive data packing in accordance with one or more embodiments described herein.

FIG. 5 illustrates an example, non-limiting graphical representation 500 in accordance with one or more embodiments described herein. Repetitive description of like elements employed in other embodiments described herein is omitted for sake of brevity.

The graphical representation 500 illustrates workload (e.g., container resource demand) associated with the container data 112. For instance, the graphical representation 500 can include container resource demand 502 associated with the container data 112, container resource demand 504 associated with the container data 112, container resource demand 506 associated with the container data 112, and container resource demand 508 associated with the container data 112. In an example, the container resource demand 502 can correspond to resource demand for first container data associated with the container data 112, the container resource demand 504 can correspond to resource demand for second container data associated with the container data 112, the container resource demand 506 can correspond to resource demand for third container data associated with the container data 112, and the container resource demand 508 can correspond to fourth container data associated with the container data 112.

In an embodiment, the container component 104 (e.g., the container variability component 202) can determine an average value (e.g., AVG_W shown in FIG. 5) of the container resource demand 502 associated with the container data 112, the container resource demand 504 associated with the container data 112, the container resource demand 506 associated with the container data 112, or the container resource demand 508 associated with the container data 112. Furthermore, the container component 104 (e.g., the container variability component 202) can determine a standard deviation value (e.g., STDEV_W shown in FIG. 5) of the container resource demand 502 associated with the container data 112, the container resource demand 504 associated with the container data 112, the container resource demand 506 associated with the container data 112, or the container resource demand 508 associated with the container data 112. Based on the average value (e.g., AVG_W) and the standard deviation value (e.g., STDEV_W), the container component 104 (e.g., the container variability component 202) can determine variability data (e.g., COV_W shown in FIG. 5). For example, the variability data (e.g., COV_W) can correspond to the standard deviation value (e.g., STDEV_W) divided by the average value (e.g., AVG_W). As such, the variability data (e.g., COV_W) can be, for example, a coefficient of variation related to the container resource demand 502 associated with the container data 112, the container resource demand 504 associated with the container data 112, the container resource demand 506 associated with the container data 112, or the container resource demand 508 associated with the container data 112. Moreover, the variability data (e.g., COV_W) can be a coefficient of variation for variability in workload (e.g., container resource demand) associated with the container data 112.

Figure 6:
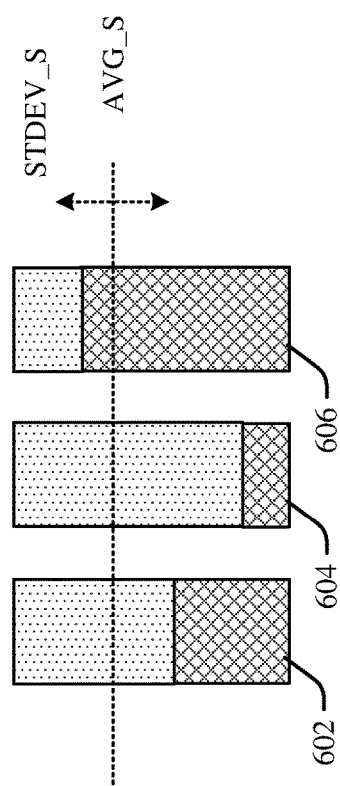
FIG. 6 illustrates another example, non-limiting graphical representation associated with adaptive data packing in accordance with one or more embodiments described herein.

FIG. 6 illustrates an example, non-limiting graphical representation 600 in accordance with one or more embodiments described herein. Repetitive description of like elements employed in other embodiments described herein is omitted for sake of brevity.

The graphical representation 600 illustrates system availability (e.g., system resource availability) associated with a set of computing nodes. For instance, the graphical representation 600 can include computing node resource availability 602 associated with the set of computing nodes 406$_{1-N}$, computing node resource availability 604 associated with the set of computing nodes 406$_{1-N}$, and computing node resource availability 606 associated with the set of computing nodes 406$_{1-N}$. In an example, the computing node resource availability 602 can correspond to resource availability for a first computing node from the set of computing nodes 406$_{1-N}$, the computing node resource availability 604 can correspond to resource availability for a second computing node from the set of computing nodes 406$_{1-N}$, and the computing node resource availability 606 can correspond to resource availability for a third computing node from the set of computing nodes 406$_{1-N}$.

In an embodiment, the container component 104 (e.g., the computing node variability component 302) can determine an average value (e.g., AVG_S shown in FIG. 6) of the computing node resource availability 602 associated with the set of computing nodes 406$_{1-N}$, the computing node resource availability 604 associated with the set of computing nodes 406$_{1-N}$, or the computing node resource availability 606 associated with the set of computing nodes 406$_{1-N}$. Furthermore, the container component 104 (e.g., the computing node variability component 302) can determine a standard deviation value (e.g., STDEV_S shown in FIG. 6) of the computing node resource availability 602 associated with the set of computing nodes 406$_{1-N}$, the computing node resource availability 604 associated with the set of computing nodes 406$_{1-N}$, or the computing node resource availability 606 associated with the set of computing nodes 406$_{1-N}$. Based on the average value (e.g., AVG_S) and the standard deviation value (e.g., STDEV_S), the container component 104 (e.g., the computing node variability component 302) can determine variability data (e.g., COV_S shown in FIG. S). For example, the variability data (e.g., COV_S) can correspond to the standard deviation value (e.g., STDEV_S) divided by the average value (e.g., AVG_S). As such, the variability data (e.g., COV_S) can be, for example, a coefficient of variation related to the computing node resource availability 602 associated with the set of computing nodes $406_{1-N}$, the computing node resource availability 604 associated with the set of computing nodes $406_{1-N}$, or the computing node resource availability 606 associated with the set of computing nodes $406_{1-N}$. Moreover, the variability data (e.g., COV_S) can be a coefficient of variation for variability in system availability over the set of computing nodes $406_{1-N}$. In an embodiment, the computing node component 106 can select a computing node from the set of computing nodes $406_{1-N}$ for particular container data such that the variability data (e.g., COV_W) determined by the container variability component 202 approximately equals the variability data (e.g., COV_S) determined by the computing node variability component 302. For instance, when placing a container in a storage location associated with the set of computing nodes $406_{1-N}$, the computing node component 106 can attempt to equalize the coefficient of variation of container demand and computing node availability.

Figure 7:
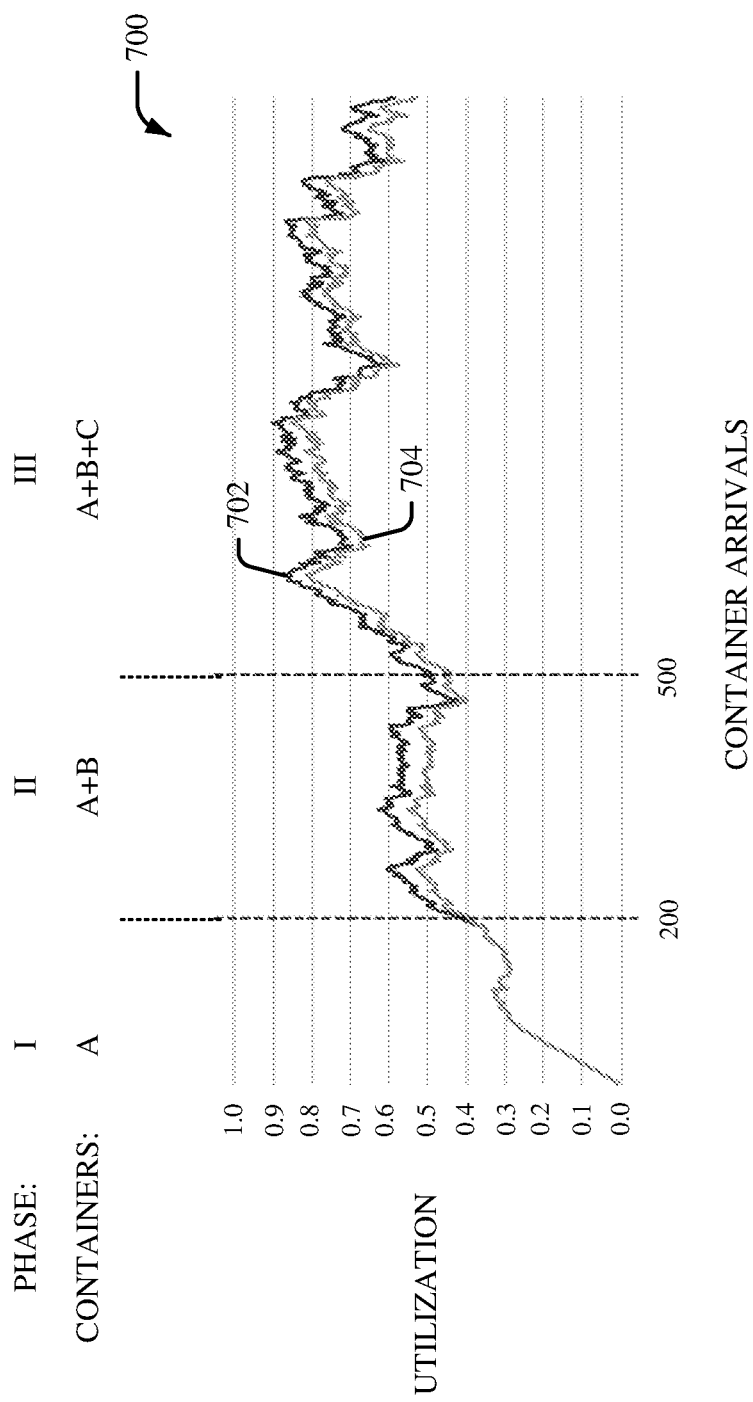
FIG. 7 illustrates an example, non-limiting graph associated with load patterns in accordance with one or more embodiments described herein.

FIG. 7 illustrates an example, non-limiting graph 700 in accordance with one or more embodiments described herein. Repetitive description of like elements employed in other embodiments described herein is omitted for sake of brevity.

The graph 700 can illustrate one or more load patterns associated with one or more containers in a network environment that employs adaptive data packing, as more fully disclosed herein in connection with the adaptive data packing component 102. For example, the graph 700 can illustrate a load pattern 702 for one or more processors in the network environment with respect to container arrivals and utilization. Furthermore, the graph 700 can illustrate a load pattern 704 for memory in the network environment with respect to container arrivals and utilization. In an aspect, the graph 700 can illustrate a first phase (e.g., PHASE I) associated with a single container (e.g., CONTAINER A), a second phase (e.g., PHASE II) associated with two containers (e.g., CONTAINERS A+B), and a third phase (e.g., PHASE III) associated with three containers (e.g., CONTAINERS A+B+C). In one example, the first phase (e.g., PHASE I) can be associated with a number of container arrivals less than or equal to 200, the second phase (e.g., PHASE II) can be associated with a number of container arrivals between 200 and 500, and the third phase (e.g., PHASE DI) can be associated with a number of container greater than or equal to 500. As seen in the graph 700, the load pattern 702 for the one or more processors can approximately correspond to the load pattern 704 for the memory for different phases associated with different amounts of containers.

Figure 8:
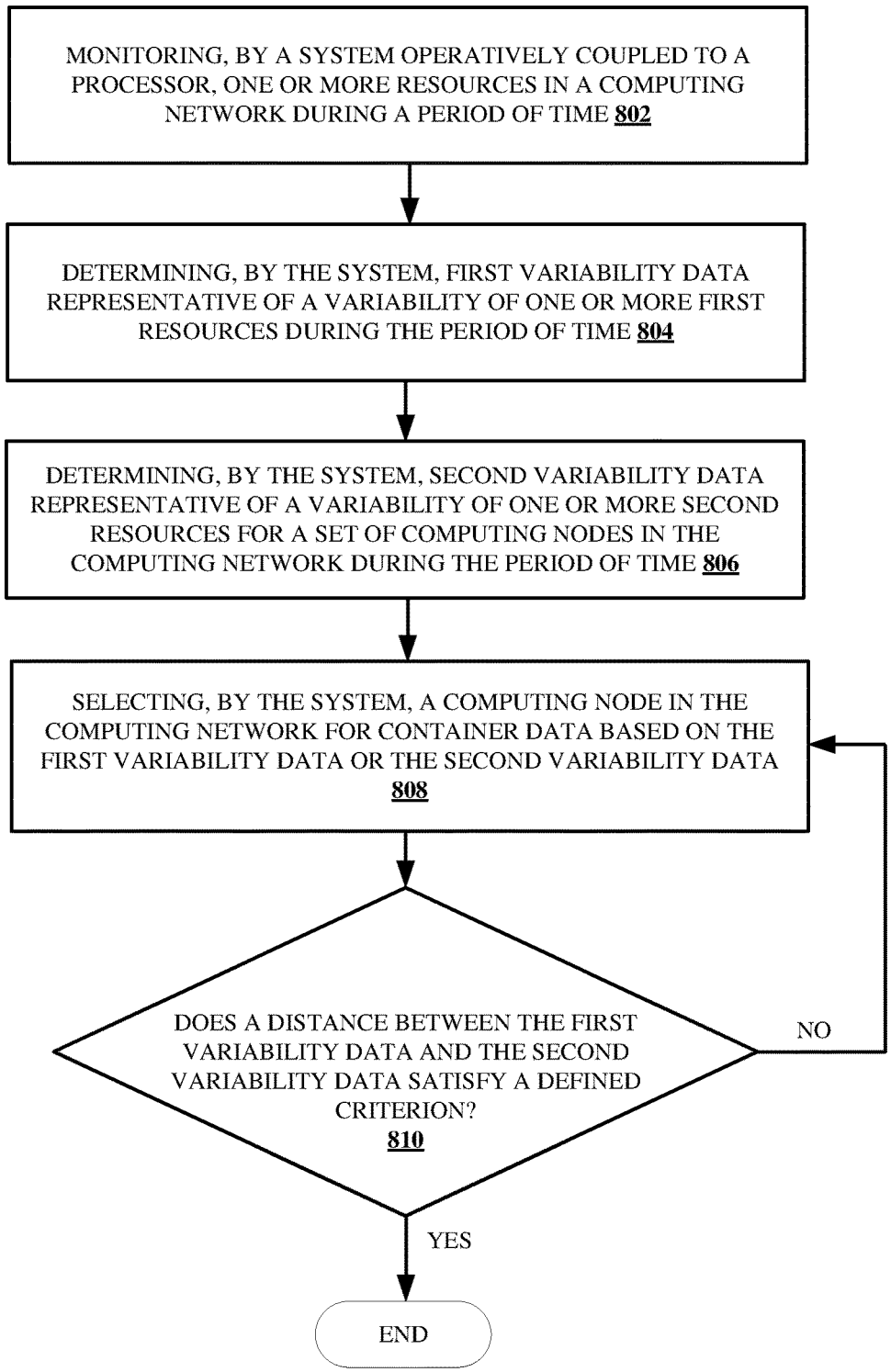
FIG. 8 illustrates a flow diagram of an example, non-limiting computer-implemented method for facilitating adaptive data packing in accordance with one or more embodiments described herein.

FIG. 8 illustrates a flow diagram of an example, non-limiting computer-implemented method 800 for facilitating adaptive data packing in accordance with one or more embodiments described herein. At 802, one or more resources in a computing network are monitored, by a system operatively coupled to a processor (e.g., by container component 104), during a period of time. The computing network can be, for example, a network environment such as a cloud network environment. The one or more resources can be, for example, associated with container data. In an aspect, one or more needs for the one or more resources can be determined. In another aspect, one or more data logs for container data can be monitored. The one or more data logs can include log data for one or more events associated with the container data or the computing network, timestamp data for one or more events associated with the container data or the computing network, metadata for one or more events associated with the container data or the computing network, or other data associated with the container data or the computing network. Additionally or alternatively, one or more metrics for the container data or the computing network can be monitored. The one or more metrics can include, for example, processor usage associated with the container data or the computing network, memory usage associated with the container data or the computing network, used memory associated with the container data or the computing network, available memory associated with the container data or the computing network, or one or more other metrics associated with the container data or the computing network. In certain embodiments, the container data can be associated with one or more resources in the computing network. For instance, the container data can be associated with one or more processors in the computing network, one or more central processing units in the computing network, one or more memories in the computing network, one or more network devices in the computing network, or one or more other devices in the computing network.

At 804, first variability data representative of a variability of one or more first resources during the period of time is determined, by the system (e.g., by container variability component 202). The one or more first resources can be, for example, a portion of the one or more resources monitored in the computing network. In an example, the first variability data can be a coefficient of variation associated with the one or more first resources during the period of time. In an aspect, the one or more first resources can be one or more resources associated with one or more processors in the computing network, one or more central processing units in the computing network, one or more memories in the computing network, one or more network devices in the computing network, or one or more other devices in the computing network. In another aspect, the first variability data can be a measure of variability for one or more needs for the one or more first resources. For example, the first variability data can be a measure of heterogeneity for one or more needs for the one or more first resources. In certain embodiments, one or more first numbers associated with the first variability data can be calculated. For instance, one or more first numbers that represent a measure of variability for container resource needs can be calculated. In an example, a first measure of variability (e.g., a first number) associated with first container resource needs for a first container can be calculated, a second measure of variability (e.g., a second number) associated with second container resource needs for a second container can be calculated, a third measure of variability (e.g., a third number) associated with third container resource needs for a third container can be calculated, etc. In yet another aspect, the first variability data can be a measure of variability in a workload associated with the container data or the computing network. The workload can be, for example, a container demand associated with the container data or the computing network.

At 806, second variability data representative of a variability of one or more second resources for a set of computing nodes in the computing network during the period of time is determined, by the system (e.g., by computing node variability component 302). The one or more second resources can be, for example, a portion of the one or more resources monitored in the computing network. In an example, the second variability data can be representative of a variability of one or more second resources for a set of computing nodes in the computing network. The set of computing nodes can be, for example, one or more computing nodes associated with one or more processors, one or more processing units, one or more memories or one or more other computing components. For instance, the set of computing nodes can be a computing cluster with one or more computing nodes associated with one or more processors, one or more processing units, one or more memories or one or more other computing components. In an aspect, one or more computing nodes from the set of computing nodes can be interconnected or communicatively coupled. In certain embodiments, the set of computing nodes can be arranged in a tree structure configuration. In an example, the second variability data can be a coefficient of variation associated with the one or more second resources for the set of computing nodes in the computing network during the period of time. In an aspect, the second variability data can be a measure of variability in resource availability for the one or more second resources for the set of computing nodes in the computing network. For example, the second variability data can be a measure of heterogeneity for an availability of the one or more second resources for the set of computing nodes in the computing network. In another aspect, one or more second numbers associated with the second variability data can be calculated. For instance, one or more second numbers that represent a measure of variability associated with the one or more second resources for the set of computing nodes in the computing network during the period of time can be calculated. In an example, a first measure of variability (e.g., a first number) associated with resource availability for a first computing node in the computing network can be calculated, a second measure of variability (e.g., a second number) associated with resource availability for a second computing node in the computing network can be calculated, a third measure of variability (e.g., a third number) associated with resource availability for a third computing node in the computing network can be calculated, etc.

At 808, a computing node in the computing network is selected, by the system (e.g., by computing node component 106), for container data based on the first variability data or the second variability data. For example, particular container data can be provided to a particular computing node from the set of computing nodes in the computing network based on the first variability data. Additionally or alternatively, particular container data can be provided to a particular computing node from the set of computing nodes in the computing network based on the second variability data. In an embodiment, a computing node in the computing network can be selected for particular container data based on an equalization measure of the first variability data and the second variability data. For instance, a computing node in the computing network can be selected for particular container data such that the first variability data and the second variability data are equalized according to an equalization measure. In one example, a computing node in the computing network can be selected for particular container data such that a value of a difference between the first variability data and the second variability data satisfy a defined criterion associated with closeness. In another embodiment, a computing node in the computing network can be selected for particular container data based on a Euclidean distance between the first variability data and the second variability data. For instance, a computing node in the computing network can be selected for particular container data such that a value of a Euclidean distance between the first variability data and the second variability data satisfy a defined criterion associated with closeness. In certain embodiments, computing node data associated with the selected computing node can be determined. The computing node data can include, for example, information associated with the selected computing node. In certain embodiments, the computing node data can include an identifier for the selected computing node, a network address for the selected computing node, resource information for the selected computing node, memory information for the selected computing node, virtual machine information for the selected computing node, bin information for the selected computing node, or other information associated with the selected computing node. In certain embodiments, the selecting the computing node can include optimizing resource usage in the computing network.

At 810, it is determined whether a distance between the first variability data and the second variability data satisfies a defined criterion. For example, it can be determined whether a distance between the first variability data and the second variability data is minimized. If no, the computer-implemented method 800 returns to 808. If yes, the computer-implemented method 800 ends.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least monitoring one or more resources in a computing network, etc. are established from a combination of electrical and mechanical components and circuitry, a human is unable to replicate or perform an adaptive data packing process performed by the adaptive data packing component 102 (e.g., the container component 104, the computing node component 106, the container variability component 202, or the computing node variability component 302) disclosed herein. For example, a human is unable to monitor one or more resources in a computing network, etc.

Figure 9:
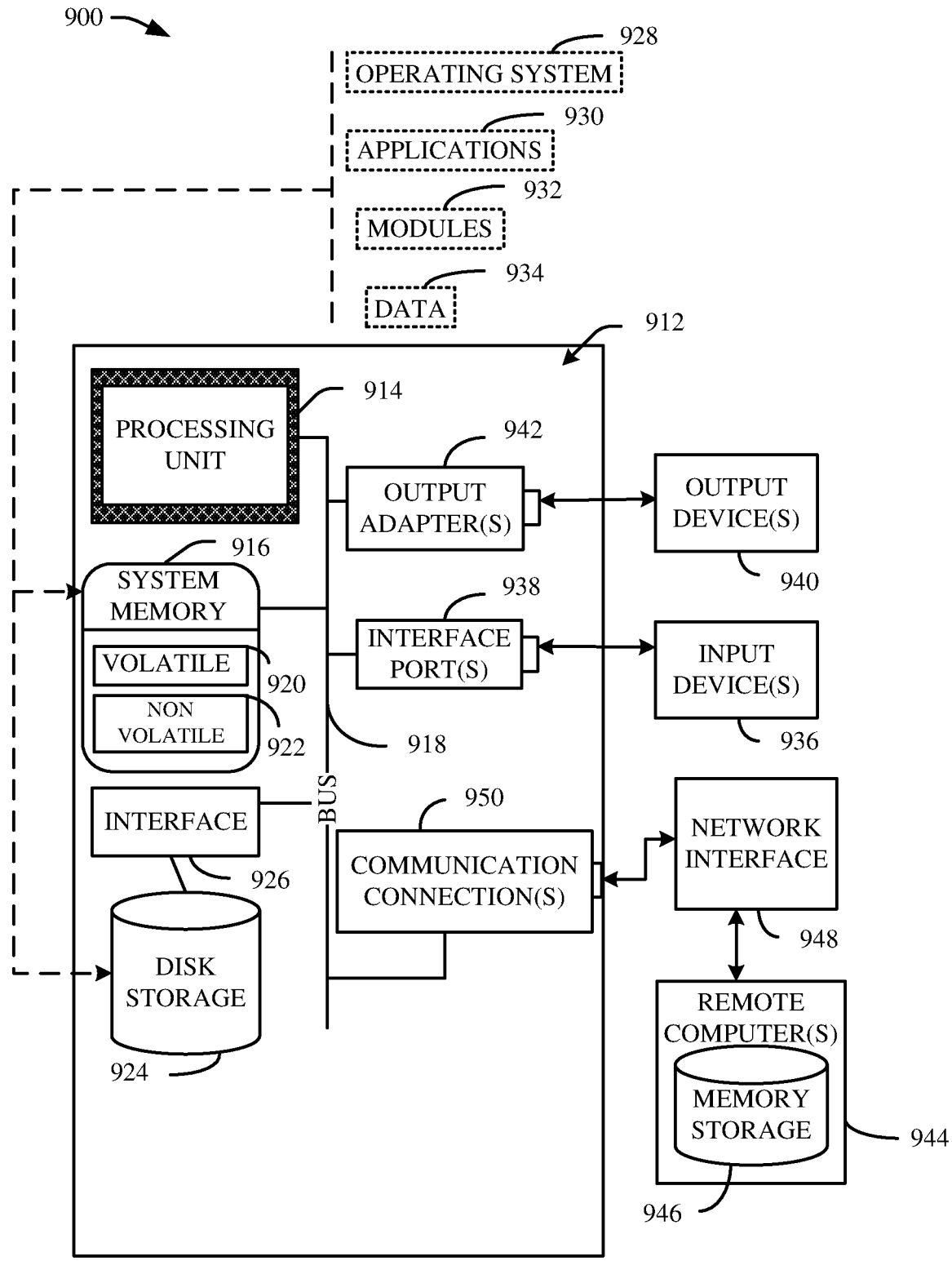
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
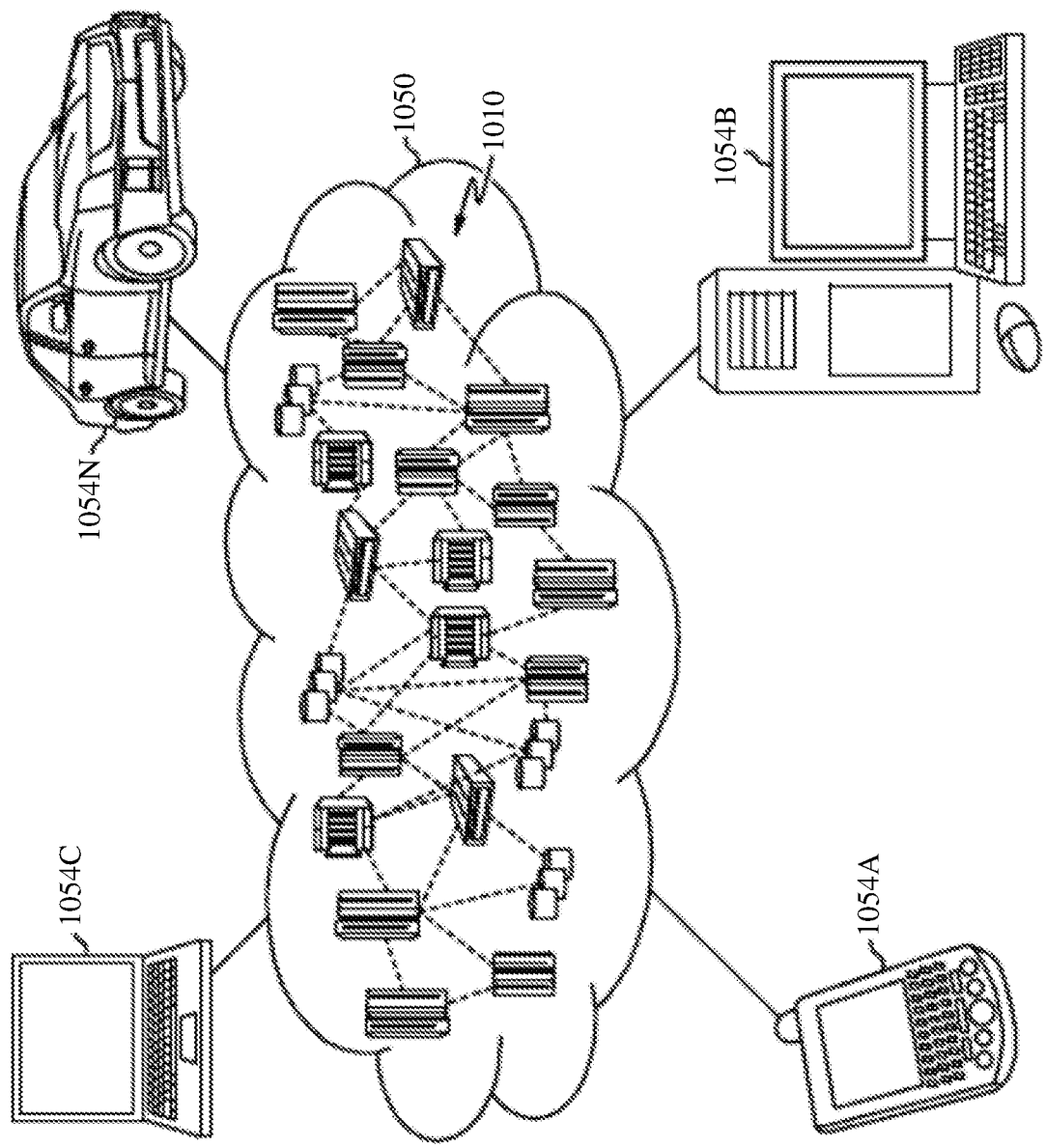
FIG. 10 illustrates a block diagram of an example, non-limiting cloud computing environment in accordance with one or more embodiments of the present invention.

Referring now to FIG. 10, an illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network or network addressable connection (e.g., using a web browser).

Figure 11:
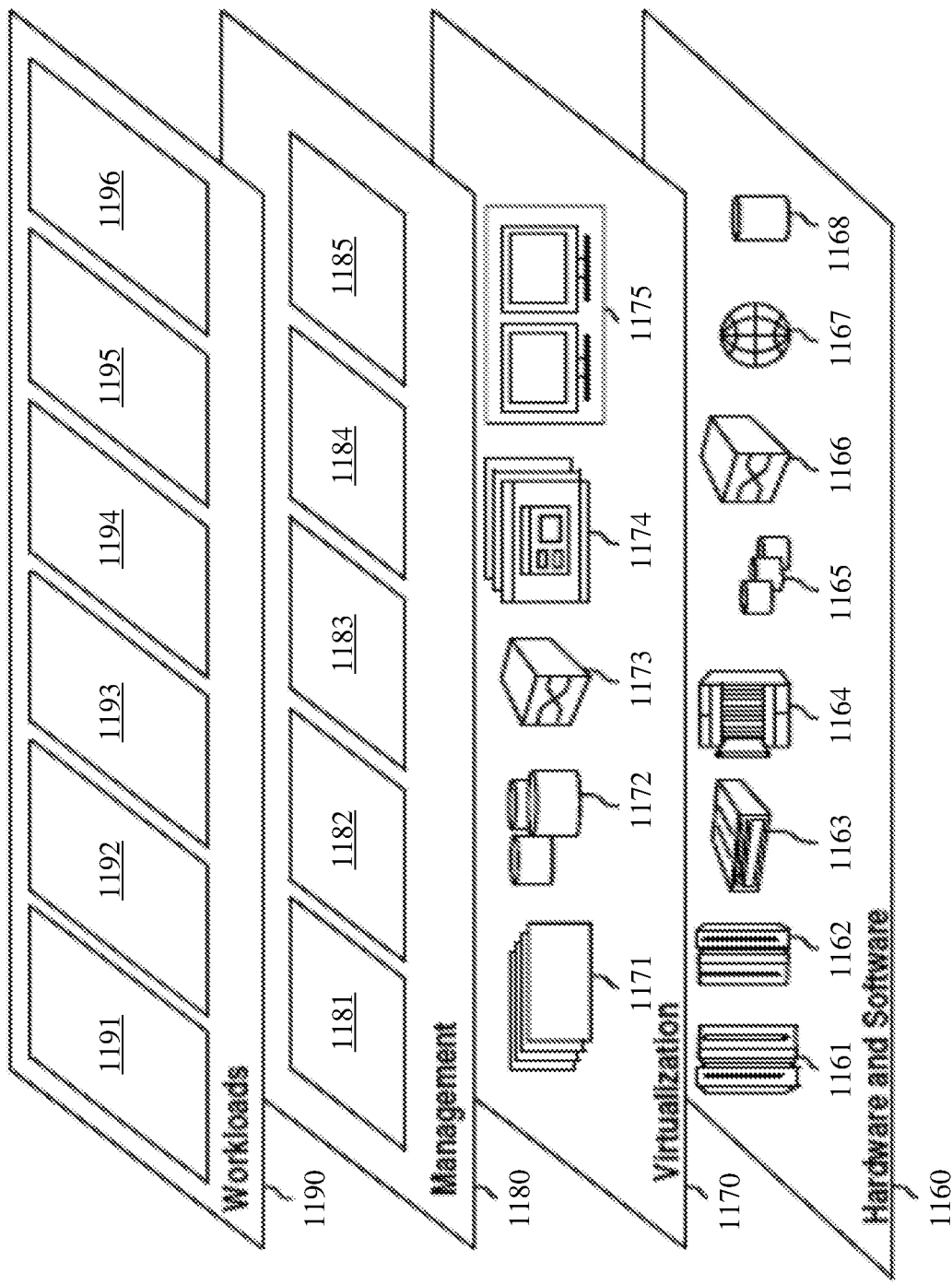
FIG. 11 illustrates a block diagram of example, non-limiting abstraction model layers in accordance with one or more embodiments of the present invention.

Referring now to FIG. 10, a set of functional abstraction layers provided by cloud computing environment 1150 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Non-limiting examples of workloads and functions which may be provided from this layer include: mapping and navigation 1191; software development and lifecycle management 1192; virtual classroom education delivery 1193; data analytics processing 1194; transaction processing 1195; and adaptive data packing process software 1196.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
   a container component that monitors one or more resources for container data in a network environment and determines variability data representative of a variability of the one or more resources for the container data during a period of time, wherein the variability data comprises a coefficient of variation associated with the one or more resources for the container data; and
   a computing node component that selects a computing node in the network environment for particular container data based on the variability data.

2. The system of claim 1, wherein the variability data is first variability data and the one or more resources are one or more first resources, and wherein the computing node component determines second variability data representative of a variability of one or more second resources for a set of computing nodes in the network environment during the period of time.

3. The system of claim 2, wherein the computing node component selects the computing node in the network environment for the particular container data based on the first variability data and the second variability data.

4. The system of claim 2, wherein the computing node component selects the computing node in the network environment for the particular container data based on an equalization measure of the first variability data and the second variability data.

5. The system of claim 2, wherein the computing node component selects the computing node in the network environment for the particular container data based on a Euclidean distance between the first variability data and the second variability data.

6. The system of claim 2, wherein the computing node component determines a coefficient of variation associated with the one or more second resources for the set of computing nodes.

7. The system of claim 1, wherein the coefficient of variation represents a measure of variability of one or more needs for the one or more resources.

8. The system of claim 1, wherein the computing node component selects the computing node to optimize resource usage in the network environment.

9. A computer-implemented method, comprising:
   monitoring, by a system operatively coupled to a processor, one or more resources in a computing network during a period of time;
   determining, by the system, variability data representative of a variability of the one or more resources during the period of time, wherein the variability data comprises a coefficient of variation associated with the one or more resources; and
   selecting, by the system, a computing node in the computing network for container data based on the variability data.

10. The method of claim 9, wherein the variability data is first variability data and the one or more resources are one or more first resources, and wherein the computer-implemented method further comprises:
    determining, by the system, second variability data representative of a variability of one or more second resources for a set of computing nodes in the computing network during the period of time.

11. The method of claim 10, wherein the computer-implemented method further comprises:
    selecting, by the system, the computing node in the computing network for the container data based on the first variability data and the second variability data.

12. The method of claim 10, wherein the computer-implemented method further comprises:
    selecting, by the system, the computing node in the computing network for the container data based on an equalization measure of the first variability data and the second variability data.

13. The method of claim 10, wherein the computer-implemented method further comprises:
    selecting, by the system, the computing node in the computing network for the container data based on a Euclidean distance between the first variability data and the second variability data.

14. The method of claim 10, wherein the computer-implemented method further comprises:

determining, by the system, a coefficient of variation associated with the one or more second resources for the set of computing nodes.

15. The method of claim 9, wherein the selecting the computing node comprises optimizing resource usage in the computing network.

16. A computer program product for facilitating adaptive data packing, the computer program product comprising a computer readable storage medium having program instructions embodied therewith, the program instructions executable by a processor to cause the processor to:
- monitor, by the processor, one or more resources in a network environment during a period of time;
- determine, by the processor, first variability data representative of a variability of one or more first resources during the period of time, wherein the first variability data comprises a coefficient of variation associated with the one or more first resources;
- determine, by the processor, second variability data representative of a variability of one or more second resources for a set of computing nodes in the network environment during the period of time; and
- select, by the processor, a computing node in the network environment for container data based on the first variability data and the second variability data.

17. The computer program product of claim 16, wherein the program instructions are further executable by the processor to cause the processor to:
- select, by the processor, the computing node in the network environment for the container data based on an equalization measure of the first variability data and the second variability data.

18. The computer program product of claim 16, wherein the program instructions are further executable by the processor to cause the processor to:
- select, by the processor, the computing node in the network environment for the container data based on a Euclidean distance between the first variability data and the second variability data.

19. The computer program product of claim 16, wherein the
- coefficient of variation represents a measure of variability of one or more needs for the one or more first resources.

20. The computer program product of claim 16, wherein the program instructions are further executable by the processor to cause the processor to:
- determine, by the processor, a coefficient of variation associated with the one or more second resources.

* * * * *